May 12, 1931. S. F. BRIGGS 1,804,457
CLUTCH MECHANISM
Original Filed May 14, 1926 2 Sheets-Sheet 1
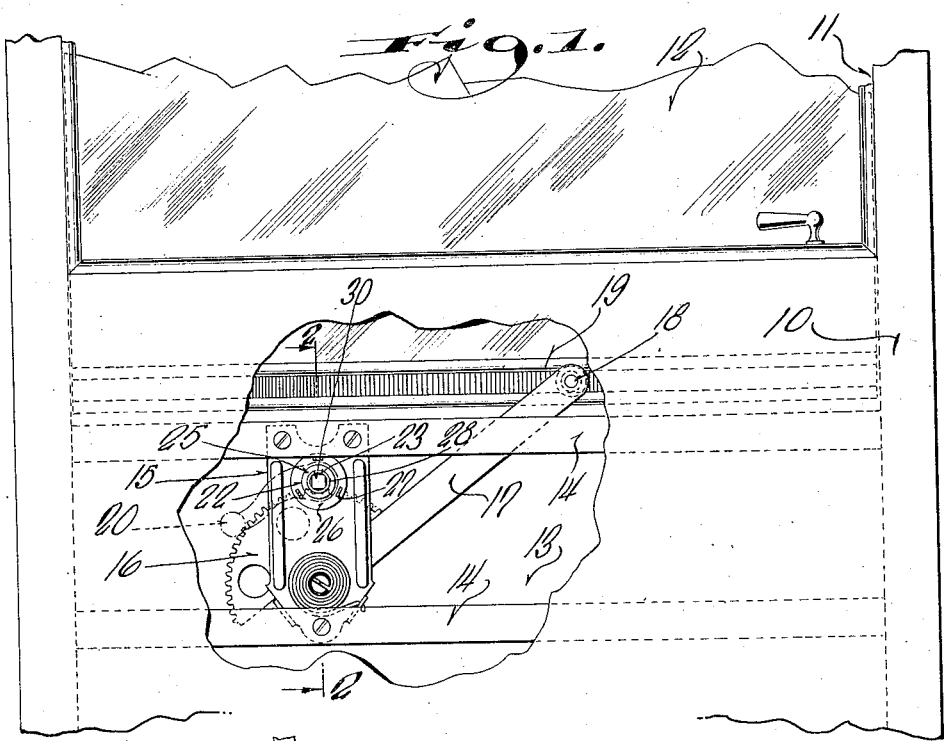
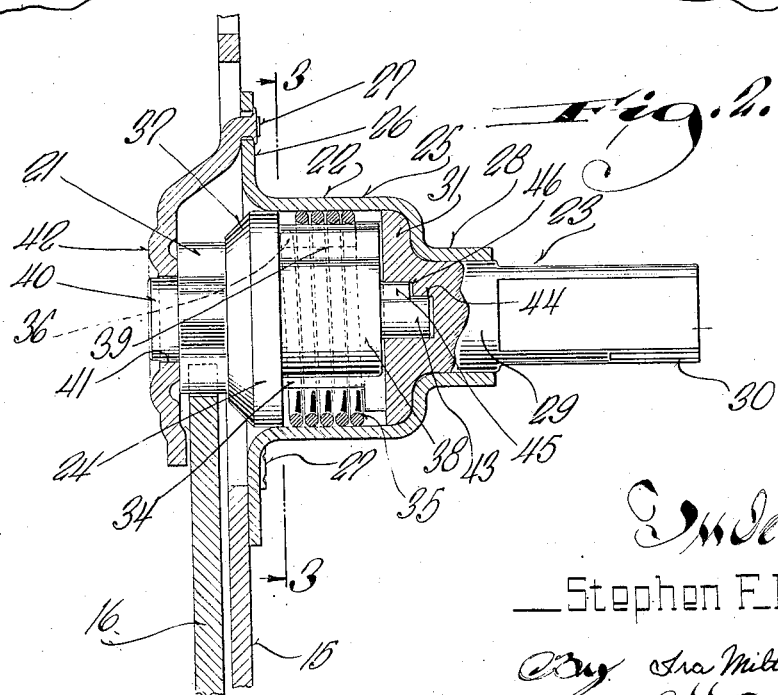
Stephen F. Briggs
By Ira Milton Jones

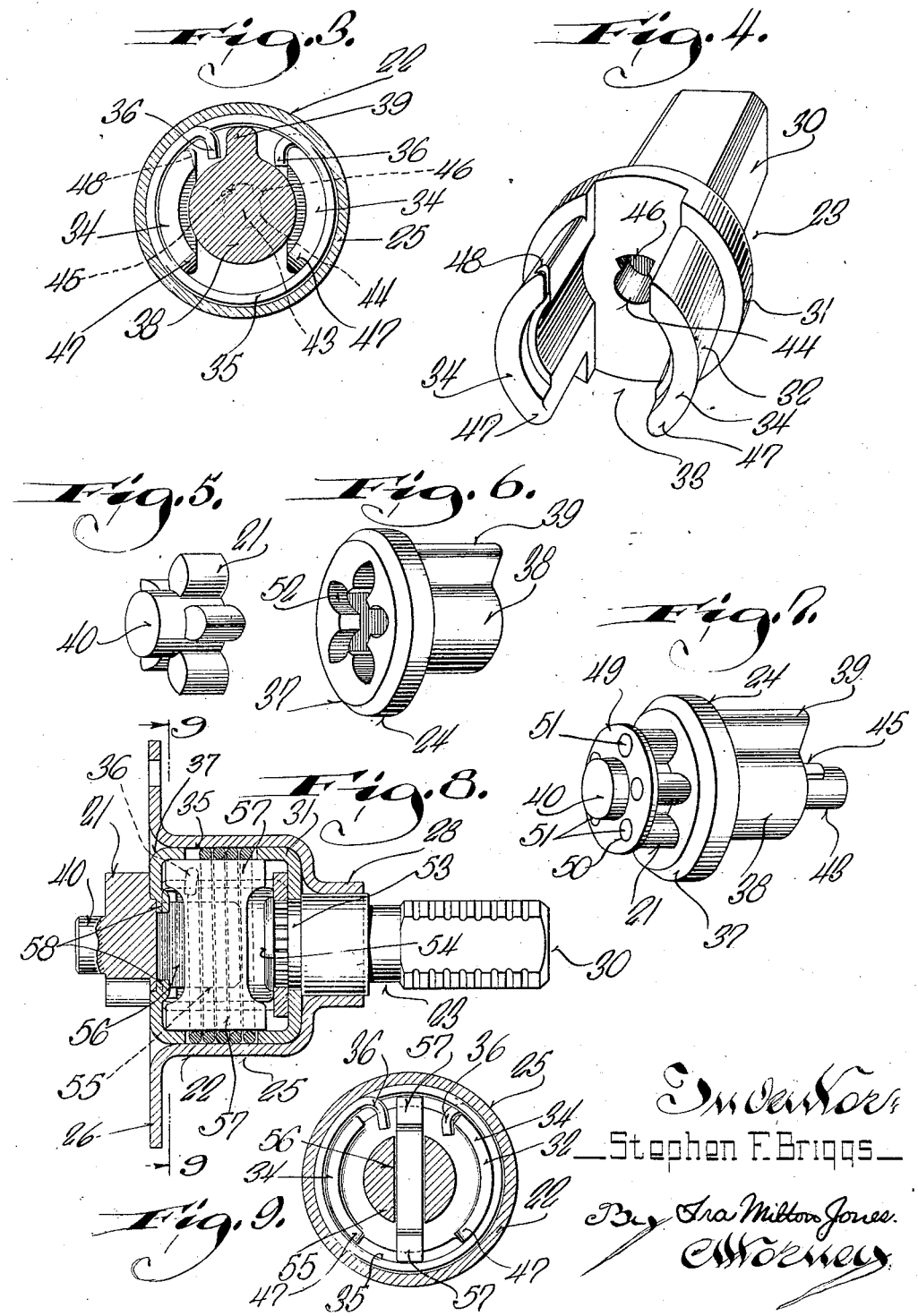

Patented May 12, 1931

1,804,457

UNITED STATES PATENT OFFICE

STEPHEN F. BRIGGS, OF MILWAUKEE, WISCONSIN, ASSIGNOR TO BRIGGS & STRATTON CORPORATION, OF MILWAUKEE, WISCONSIN, A CORPORATION OF DELAWARE

CLUTCH MECHANISM

Application filed May 14, 1926, Serial No. 109,090. Renewed December 19, 1927.

This invention refers more particularly to a clutch mechanism especially designed for use with window regulators of the type employed in closed vehicles and is especially directed to devices of the character illustrated in Letters Patent Number 1,534,804, issued Hubert A. Myers, April 2, 1925, and Number 1,537,223, issued Angelo R. Clas, May 12, 1925.

In the production of devices of the character described, it is important that the structure and the manufacturing processes be simplified to a high degree and this invention has as one of its objects the provision of an improved clutch device wherein the structure is materially simplified and the manufacture of the same in large quantities greatly facilitated, thus effecting a material reduction of the production costs.

Another object of this invention resides in the provision of an improved clutch mechanism of the character described, of greatly simplified and durable construction so that the life thereof will be greater than the life of the average automotive vehicle.

And a still further object of this invention resides in the provision of an improved clutch mechanism having but a few parts whereby the same are unlikely to be disarranged or disconnected, thus making a very desirable device from a production standpoint as well as from a standpoint of efficiency in operation.

With the above and other objects in view, which will appear as the description proceeds, my invention resides in the novel construction, combination and arrangement of parts substantially as hereinafter described and more partciularly defined by the appended claims, it being understood that such changes in the precise embodiment of the herein disclosed invention may be made as come within the scope of the appended claims.

In the accompanying drawings, I have illustrated several complete examples of the physical embodiment of my invention constructed according to the best modes I have so far devised for the practical application of the principles thereof, and in which;

Figure 1 is a fragmentary inner side elevation of a window frame and its window member equipped with a clutch mechanism embodying my invention;

Figure 2 is an enlarged, detailed view of my improved clutch mechanism, parts being inside elevation and parts in section, said view being taken through Figure 1 on the plane of the line 2—2;

Figure 3 is a view taken transversely through Figure 2 on the plane of the line 3—3;

Figure 4 is a perspective view of one form of driving member assembly embodying my invention, the driving member being illustrated apart from the clutch mechanism assembly;

Figure 5 is a perspective view of a pinion gear adapted to be employed in connection with that type of driven member illustrated in Figure 6;

Figure 6 is a perspective view of a modified form of driven member with the pinion gear detached therefrom;

Figure 7 is a perspective view of still another modified form of driven member;

Figure 8 is a view similar to Figure 2 and illustrating still a further modified construction wherein the driving and driven members are formed from several parts, and Figure 9 is a view similar to Figure 3 and taken through Figure 8 on the plane of the line 9—9.

Referring now more particularly to the accompanying drawings, in which like numerals designate like parts throughout the several views, 10 represents the door or window frame of an automotive vehicle or the like having a window opening 11 in its upper portion and a window member 12 movable to close the opening or movable into a well 13 in the lower portion of the door frame. The customary lock board or transverse braces 14 extend across the door frame adjacent the lower portion of the window opening to mount the supporting bracket 15 of a window regulator, to be later described, adapted to transmit opening and closing movements to the window member.

The window regulator may be of any desired type, one construction being illustrated in the application of Jerome Brown, filed March 4, 1926, Serial No. 92,166, in which a segmental gear 16 is carried by the bracket 15 and has a window operating arm 17 fixed thereto with its outer free end 18 slidably engaged with the lower marginal edge portion 19 of the window member, whereby rotation of the segmental gear in one direction moves the window member to close the opening and rotation in the reverse direction moves the window member free of the opening and into the well 13. The segmental gear is operated through a crank handle or other member 20, illustrated by conventional lines in Figure 1, which is operatively connected with a pinion gear 21 meshing with the segmental gear 16 through the improved clutch mechanism 22, now about to be described.

The clutch mechanism consists of a driving member 23 and a driven member 24 adapted to be operatively connected within a cup shaped casing forming a brake housing 25, a brake mechanism located within the housing co-operates with the driving and driven members to permit unrestricted operation of the device when rotational stress is applied to the driving member, but to oppose operation of the device when rotational stress is applied to the driven member, as by placing an opening strain on the window member 12. In the present embodiment, the brake housing is preferably formed from one piece and is of substantially cup shape, with its outer peripheral rim flanged laterally, as at 26, and riveted or otherwise secured to the bracket 15, as at 27. The closed end of the brake housing has a central opening therein from which a sleeve or bearing portion 28 extends to receive the journal portion 29 of the driving member shaft 30, on the outer end of which the window operating handle 20 is adapted to be secured. Carried by the inner end of the driving member shaft within the housing 25 is a flange or collar member 31 and a cup shaped member 32, the opposed walls of the member 32 being slotted, as at 33, to form two lugs 34. The outer peripheral surfaces of the lugs form a drum about which a spring 35 is coiled, the ends of the spring being inturned, as at 36, into the slot between adjacent ends of the lugs 34.

The driven member 24 consists of a collar or flange 37 which fits in the open end of the brake housing and an extension 38 on the pinion gear 21 and projecting into the cup shaped member 32 of the driving member and carrying a driving key 39 adapted to be engaged between the inturned spring ends and the adjacent ends of the lugs 34. A journal 40 projects outwardly from the pinion gear 21 and engages in a bearing 41 formed in a portion 42 pressed out of the bracket 15 to provide a guideway in which the toothed edge of the segmental gear rides.

It will be thus apparent that with the driving member and driven member assembled within the brake housing, they form a spool shaped drum about which the spring 35 is coiled, thus securing the spring against exerting an end thrust on a stationary part when the window is being operated. The spring 35 is normally compressed with its ends closer than the width of the slot between the driving member lugs so that the periphery of the spring normally frictionally contacts with the brake housing wall and a rotational stress applied to the driving member engages the end of the lug 34 leading the direction of rotation with the adjacent spring inturned end and the driving key 39, tending to coil the spring tighter about the driving member and decreasing its frictional contact with the wall of the brake housing, permitting unrestricted rotation of the driving member and consequently the driven member to manipulate the window 12 through the pinion 21, segmental gear 16 and the window operating arm 17. A rotational stress applied to the driven member, as by downward jarring of the window 12 or an attempt to open the window 12 by exerting a downward movement thereon, causes the driving key 39 of the driven member to engage the inturned end of the spring leading the direction of rotation and tend to spread the ends of the spring increasing its frictional contact with the brake housing and thus firmly securing the mechanism against operation.

In Figures 2, 3 and 4, I have illustrated one manner of forming the driving member and driven member in two pieces, preferably by die casting. In this structure, the extension 38 of the driven member has a short stub shaft 43 bearing in an opening 44 in the flange 31 and shaft 23, the shaft 43 preferably having a key 45 which co-operates with an offset 46 to prevent improper assembling of the device. One end of each lug 34 is rounded, as at 47, to prevent the improper placing of the spring on the lugs and the opposite end of one lug is notched or recessed, as at 48, in which the adjacent inturned end of the spring may rest, as shown in Figure 3.

It thus will be apparent that the rounded ends 47 and the key 45 on the stud shaft 43 co-operate to eliminate all possibility of the wrong assembling of the device and further that the shaft 43 having a bearing in the opening 44 maintains the driving member and driven member in proper concentric position. If desired, the gear 21 which is die cast integral with the driving member in the construction illustrated in Figures 2 and 3, may be reinforced by a metal washer or plate 49 fitted over the journal 40 and having a plurality of openings 50 therein for receiving tits or lugs 51 integral with the gear teeth, as clearly illustrated.

In Figures 5 and 6, I have illustrated a modified construction of driven member illustrated in Figure 7 wherein the pinion 21 and its journal 40 are formed apart of the driven member proper preferably of steel or other metal and pressed in a recess 52 of a shape to snugly receive the same. In this construction a pinion gear of harder metal than that obtainable by die casting is provided to thus insure added durability.

In Figures 8 and 9 the driving member and driven member are illustrated as having their major portions with the exception of their shafts and the pinion gear, pressed from bendable metal. In this form of my invention the driving member has the flange or collar 31 of approximately cup or dished shape and fitted over a reduced portion 53 on the shaft inner end and there secured by engaging thereover the closed end of the cup shaped member 32 which is likewise pressed from bendable metal and secured in place by riveting over the end of the shaft 30, as at 54. This gives an equivalent structure to that illustrated in Figure 4.

The driven member has the pinion gear 21 and a shaft extension 55 milled from suitable stock metal and the flange or collar member 37 is pressed from bendable metal and engaged over the extension 55 to abut the inner end of the gear 21, being there secured by striking ears or tongues 58 inwardly from the washer into a slot 56 in the ends of the extension, as illustrated in Figure 8. This provides an assembly similar to that illustrated in Figures 2 and 6, with the exception of the driving key 57 which is in the form of a separate part having a reduced medial portion engageable in the slot 56 with its ends engageable between the adjacent ends of the lugs 34.

It will be apparent that when assembled, the structure illustrated in Figures 8 and 9 likewise forms a spool shaped drum for receiving the spring 35 to protect against end thrust causing the spring to bind against a stationary part and resist the opening and closing of the window.

From the foregoing description taken in connection with the accompanying drawing, it will be readily apparent to those skilled in the art to which an invention of the character described appertains, that I have provided an improved clutch mechanism especially designed for use in connection with window regulators of automotive vehicles wherein but a few parts are necessary and the parts are so arranged that their disconnection and improper assembling is prevented. It will also be apparent that I have provided a novel and improved clutch mechanism which readily lends itself to quantity production without the sacrifice of any efficiency.

What I claim as my invention is:

1. In a device of the character described, a normally stationary housing, a rotatable driving member having one end located within the housing, a rotatable driven member having one end located within the housing, a pair of spaced lugs carried by the end of the driving member within the housing, a spring coiled about the lugs of the driving member with its ends directed inwardly over adjacent ends of the lugs, the peripheral surface of the spring normally frictionally gripping the wall of the housing to resist rotation of the driving member therein, and a driving key carried by the driven member and engageable between the inturned ends of the spring and the adjacent lug ends, whereby rotational stress applied to the driving member draws the spring ends together to reduce the frictional contact between the spring and housing and rotates the driven member, and a rotational stress applied to the driven member tends to spread the inturned ends of the spring to increase its frictional contact with the housing and prevent rotation of the member.

2. In a device of the character described, a normally stationary housing, a rotatable driving member having one end located within the housing, a rotatable driven member having one end located within the housing, a pair of space lugs carried by the end of the driving member within the housing, the peripheries of the lugs forming a cylinder having its axis common to that of the driving member, a flange on the driven member having its inner face provided with a recess in its inner face to receive the ends of the lugs, a spring coiled about the lugs of the driving member with its ends directed inwardly between adjacent ends of the lugs, the peripheral surface of the spring normally frictionally gripping the wall of the housing to resist rotation of the driving member therein, and a driving key carried by the driven member and engageable between the inturned ends of the spring and the adjacent lug ends, whereby rotational stress applied to the driving member tends to draw the spring ends together to reduce the frictional contact between the spring and housing and a rotational stress applied to the driven member tends to spread the ends of the spring to increase its frictional contact with the housing and prevent the rotation of the member.

3. In a device of the character described, a normally stationary housing, a rotatable driving member having one end located within the housing, a rotatable driven member having one end located within the housing, a pair of spaced lugs carried by the end of the driving member within the housing, a shoulder formed at the base of the lugs, the peripheries of the lugs forming a cylinder having its axis common to that of the driving member, a flange on the driven member having its inner face provided with a recess in its inner face to receive the ends of the lugs, the lugs, driving member, shoulder and driven member flange forming a spool, a spring coiled about the spool with its ends inturned between adjacent ends of the lugs, the peripheral surface of the spring normally frictionally gripping the wall of the housing to resist rotation of the driving member therein, and a driving key carried by the driven member and engageable between the inturned ends of the spring and the adjacent lug ends, whereby rotational stress applied to the driving member tends to draw the spring ends together to reduce the frictional contact between the spring and housing and a rotational stress applied to the driven member tends to spread the ends of the spring to increase its frictional contact with the housing and prevent the rotation of the member.

4. In a device of the character described, a normally stationary housing, a rotatable driving member having one end located within the housing and including a shaft having its inner end extended into the housing, a cup member having a shoulder fitted over the inner end of the shaft and having its wall slotted to form two spaced abutments, means non-rotatably fixing the washer and cup member to the shaft, a rotatable driven member having one end located in the housing, a spring coiled about the cup member with its ends inturned to extend over the abutments, the peripheral surface of the spring normally frictionally gripping the wall of the housing to resist rotation of the driving member therein, and a driving key carried by the driven member and engaged between the inturned ends of the spring and the abutments, whereby rotational stress applied to the driving member tends to draw the spring ends together to reduce the frictional contact between the spring and housing and a rotational stress applied to the driven member tends to spread the ends of the spring to increase its frictional contact with the housing and resist rotation of the member.

5. In a device of the character described, a normally stationary housing, a rotatable driving member having one end located within the housing and including a shaft having its inner end extended into the housing, a washer fitted over the inner end of the shaft and a cup member fitted over the inner end of the shaft with its closed end abutting the washer and having its diametrically opposed walls slotted to form two complementary lugs, means securing the washer and cup member on the shaft, a rotatable driven member having one end located in the housing, a spring coiled about the lugs of the cup member with its ends inturned to extend into one slot thereof, the peripheral surface of the spring normally frictionally gripping the wall of the housing to resist rotation of the driving member therein, and said driven member including a shaft having its inner end slotted and extended into the housing, a driving key engaged in said slot and having an end extended between the inturned spring ends and the adjacent lug ends and a washer member secured over the inner end of the shaft outwardly of the driving key and fixed to the shaft, rotational stress applied to the driving member tending to draw the spring ends together to reduce the frictional contact between the spring and housing and a rotational stress applied to the driven member tending to spread the ends of the spring to increase its frictional contact with the housing and prevent the rotation of the member.

6. In a device of the character described, a normally stationary housing, a rotatable driving member having one end located within the housing and including a shaft having its inner end extended into the housing, a washer fitted over the inner end of the shaft and a cup member fitted over the inner end of the shaft with its closed end abutting the washer and having its diametrically opposed walls slotted to form two complementary lugs, the inner end of the shaft being riveted over to secure the shaft, a rotatable driven member having one end located in the housing, a spring coiled about the lugs of the cup member with its ends inturned to extend into one slot thereof, the peripheral surface of the spring normally frictionally gripping the wall of the housing to resist rotation of the driving member therein, and said driven member including a shaft having its inner end slotted and extended into the housing, a driving key engaged in said slot and having an end extended between the inturned spring ends and the adjacent lug ends, a washer member secured over the inner end of the shaft outwardly of the driving key and tits pressed from the washer member into the shaft slot to secure the washer member to the shaft, rotational stress applied to the driving member tending to draw the spring ends together to reduce the frictional contact between the spring and housing and a rotational stress applied to the driven member tending to spread the ends of the spring to increase its frictional contact with the housing and prevent the rotation of the member.

7. In a clutch mechanism of the character described, a driven member including a die cast part and a pinion gear formed of harder metal than the die cast part pressed in a complementary recess in one end of the die cast part.

8. In a device of the character described, a normally stationary housing, a rotatable driving member having one end located within the housing and including a shaft having its inner end extended into the housing, a flange on the inner end of the shaft and a cup member on the inner end of the shaft and having its diametrically opposed walls slotted to form two complementary lugs, a spring coiled about the lugs with its ends inturned over adjacent ends of the lugs, and a rotatable driven member having one end located in the housing and including a shaft extended into the space between the driving member lugs, a flange on the outer end of said shaft and closing the open end of the brake housing, a driving key carried by the shaft and engaged between the inturned ends of the spring and the adjacent lug ends, the driven member, shaft, flange and driving key being cast in one piece and a pinion gear adapted to be pressed in a complementary recess in the outer face of the driven member flange, rotational stress applied to the driving member tending to draw the spring ends together to reduce the frictional contact between the spring and housing and a rotational stress applied to the driven member tending to spread the ends of the spring to increase its frictional contact with the housing and prevent the rotation of the member.

9. In a device of the character described, a normally stationary housing, a rotatable driving member having one end located within the housing, a rotatable driven member having one end located within the housing, a slotted enlargement carried by the end of the driving member within the housing, a spring coiled about the enlargement of the driving member with its ends directed into the slot over the adjacent walls thereof, the peripheral surface of the spring normally frictionally gripping the wall of the housing to resist rotation of the driving member therein, and a driving projection carried by the driven member and engageable between the inturned ends of spring and the adjacent walls of the slot whereby rotational stress applied to the driving member draws the spring ends together to reduce the frictional contact between the spring and housing and rotates the driven member, and a rotational stress applied to the driven member tends to spread the inturned ends of the spring to increase its frictional contact with the housing and prevent rotation of the member.

10. In a clutch device, a stationary shell, two rotatable members having limited relative movement, one of the members having an enlarged portion within the shell and out of contact therewith and provided with a groove forming spaced edges approximately on a radial line thereof and further being provided with a circular rib adjacent one end thereof, the external diameter of which is nearly the inner diameter of the shell, a cylindrical coiled spring positioned on the said enlarged portion and seating at one end against the said rib, the end turns of the coil being inturned to engage in the space between the said spaced edges of the groove, the other of said members having a lug extending into the said groove and lying between the inturned ends of the spring and in spaced relation therewith whereby on the turning of the second member the spring is caused to expand to frictionally engage the inner face of the shell and on rotative movement of the first rotatable member the spring is permitted to contract and thus freed from material frictional engagement with the shell.

11. In a clutch device, a stationary shell, a driving member and a driven member rotatably supported in the shell, the said driving member having an enlarged portion within a corresponding portion of the shell and out of contact therewith, said enlarged portion being provided with a longitudinal groove forming spaced edges lying approximately on a radial line thereof and having a cylindrical extension of less diameter at the end adjacent the enlarged portion and a shank for connection of a driving means at the opposite end, the driven member including a gear centrally apertured to engage over the said cylindrical extension of the driving member and a cupped member providing a cylindrical flange engaging in the shell at its outer surface and into which the enlarged portion of the driving member extends, a circular rib at the opposite end of the enlarged portion of the driving member, a cylindrical coiled spring on the enlarged portion of the driving member lying in the space between the rib and the flange of the driven member, said flange having an integral extension inset to lie in the groove of the driving member and being less in width than the space between the edges of the groove of the driving member and lying between the inturned ends of the spring, the arrangement providing that on rotation of the driven member in either direction the spring ends are first engaged to cause an expansion of the spring and then said extension comes into engagement with one or the other of said edges of the groove depending on the direction of rotation of the driven member before the inturned ends of the spring are moved to engagement with the edges forming the groove and whereby force applied to the driving member will cause one or the other of said edges to drive the driven member.

12. In a clutch mechanism of the character described, a member including a flange and a pinion gear secured in a complementary recess in said flange.

13. In a clutch mechanism of the character described, a driving member, a driven member, means drivingly connecting said members, a flange on the outer portion of the driven member, and a pinion gear pressed in a complementary recess in the driven member flange.

14. A clutch device consisting of three members, two of which are rotatable relative to the third and arranged to permit a limited relative rotative movement on the same axis, a coiled spring between the rotatable members and the third member for frictionally engaging the third member, said spring having its opposite ends bent for positive engagement with the rotatable members, one of the said rotative members having an integral lug extending between the bent ends of the spring whereby the pressure against either of the said bent ends through turning of the said member causes frictional engagement between the spring and the third member preventing rotation of the said rotatable members, the other rotatable member having a longitudinal slot to receive the ends of the spring and the lug of the first rotative member and rotation of said other rotatable member contracting the spring and releasing the same from frictional engagement with the third member and driving the first rotative member through engagement with its lug, one rotative member having an extension and the other rotative member having a recess to receive and support the same on the axis of the third member.

15. In a clutch device, a stationary hollow shell, two rotatable members supported by the shell, said two rotatable members having limited relative movement, one of said members having an enlarged portion within the hollow shell formed with a slot providing spaced edges, approximately on a radial line thereof, a cylindrical coiled spring member within which the said slotted member is positioned, each end of the spring having an inturned bent end engaging over the respective edges and in spaced relation, the other of said members having a lug extending into the slot between the said bent ends of the spring and in spaced relation therewith whereby on the turning of the second member the spring is expanded to frictional engagement with the stationary shell and on rotative movement of the other rotatable member the spring is contracted and freed from material frictional engagement with the shell.

In testimony whereof I hereunto affix my signature.

STEPHEN F. BRIGGS.